United States Patent Office 3,187,416
Patented June 8, 1965

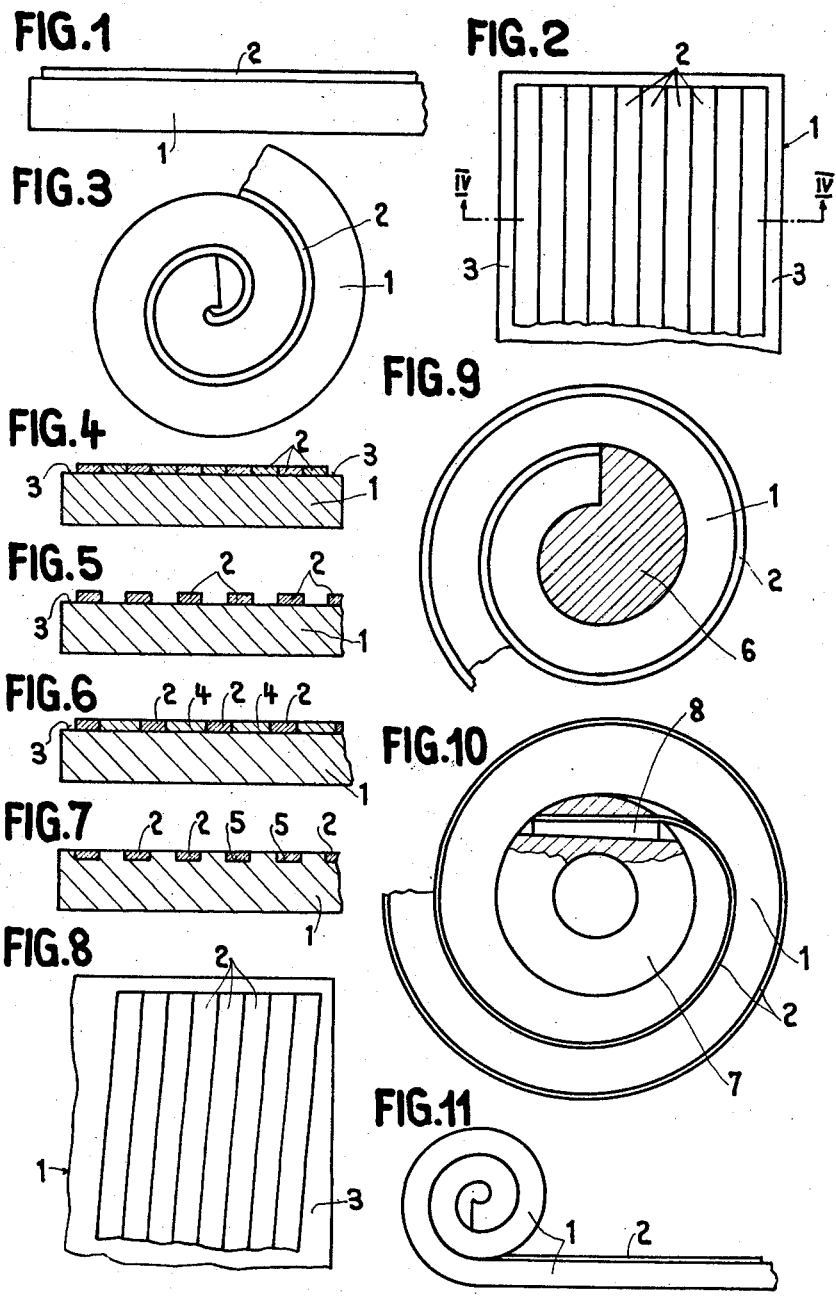

3,187,416
METHOD FOR MANUFACTURING SPIRAL SPRINGS, PARTICULARLY FOR WATCH-MAKING
Paul Tuetey, Combe-Sandoz 15, and André Simon-Vermot, Rue Girardet 22, both of Le Locle, Switzerland
Filed Feb. 6, 1962, Ser. No. 171,526
Claims priority, application Switzerland, Feb. 14, 1961, 1,715/61
7 Claims. (Cl. 29—173)

The invention concerns the manufacture of spiral springs, particularly for watchmaking.

Spiral springs for watchmaking (hairsprings for balances and mainsprings) have hitherto been made in the following manner: a band of material has been cut into strips of equal lengths. These strips have then been wound or coiled to form spirals and brought into small pots, having, for instance, the shape of barrels. In order that the spiral springs permanently maintain the desired spiral shape also after their removal from the said pots these pots have been submitted to a suitable heat treatment and the spiral springs have been removed from the pots only after such heat treatment. This prior manner of manufacturing spiral springs has various inconveniences. It is not economical and requires much time because only a few strips such as, for instance, four to six strips can be brought into a pot at a time. Moreover, this prior method can only be used for flat strips, that is, for strips having rectangular cross-section.

The present invention remedies these inconveniences and concerns a method for manufacturing spiral springs, particularly for watchmaking purposes, which is characterised in that one or more material strips for the springs are wound together with at least one carrier sheet, the width of said carrier sheet being at least equal to the sum of the widths of said material strips, the spiral springs being afterwards given a permanently fixed shape by heat treatment, whereupon the spiral springs are separated from the carrier sheet.

The accompanying drawing illustrates by way of examples some modes of execution of the method according to the invention.

FIG. 1 is a side view of the carrier sheet carrying the material strips in flat, i.e., unwound condition.

FIG. 2 is a top view to FIG. 1.

FIG. 3 shows the same carrier sheet and material strips as FIGS. 1 and 2, but in wound condition.

FIG. 4 is a section along the line IV—IV of FIG. 2.

FIGS. 5 to 7 are sectional views, corresponding to FIG. 4, of three other modes of execution.

FIG. 8 is a top view corresponding to FIG. 2 of a carrier sheet and material strips in a further mode of execution of the method according to the invention.

FIG. 9 shows a carrier sheet and material strips wound around a shaft.

FIG. 10 illustrates a mode of execution of the method according to the invention for manufacturing hairsprings for balances of watches, in which the material strips are previously fixed to collets usual with balances of watches.

FIG. 11 illustrates a still further mode of execution of the method according to the invention.

FIGS. 1 and 2 show on a considerably enlarged scale and in flat, i.e., unwound condition a carrier sheet 1 carrying material strips 2, made for instance of steel or other suitable material for the springs to be manufactured. The carrier sheet 1 preferably consists of metal, for instance, of copper and has a thickness in the order of for instance .10 mm. while the material strips 2 have a thickness of about .02 mm. As shown in FIG. 2, the material strips 2 are parallel to and in contact with one another. The width of the carrier sheet 1 is somewhat larger than the sum of the widths of the strips 2 so that there remain free margins 3 on opposite ends of the carrier sheet 1. The material strips 2 may either loosely rest on the carrier sheet 1 or be fixed to the sheet 1 in different manners, such as, for instance, by cementing, sealing, brazing or welding.

Now, in order to obtain spiral springs from the material strips 2, the carrier sheet 1 is wound or coiled together with the material strips 2 as shown in FIG. 3. During this operation, the winding axis is vertical to the longitudinal edges of the strips 2 (FIG. 2). After the winding or coiling operation the entire roll or coil is brought for heat treatment into a furnace having a treating temperature lying, for instance, between 500 and 700° centigrades. By this heat treatment the spiral shape of the strips 2 is permanently fixed. Afterwards, the spiral springs 2 are separated from the carrier sheet 1. This separation can, for instance, be obtained by plunging the carrier sheet 1 together with the spiral springs 2 into a solvent, for instance ammonia liquor or nitric acid, dissolving the sheet 1 without attacking the spiral springs 2. In this way, the spiral springs can be separated from the carrier sheet in a few minutes.

The method according to the invention allows of a simultaneous manufacture of a great number of spiral springs and the mechanization of the manufacture. The thickness of the carrier sheet 1 is chosen in dependence on the radial pitch of the spiral springs to be made.

Instead of placing the material strips 2 on the sheet 1 in contact with one another as shown in FIG. 2, they may be arranged on the sheet 1 at a distance from each other. In this case, the material strips 2 may be separated from each other either by empty interstices (FIG. 5) or by intermediate strips 4 (FIG. 6) arranged loosely or rigidly on the carrier sheet 1 to guarantee a determined distance of adjacent strips 2 from each other. In another mode of operation of the method according to the invention the carrier sheet 1 may be provided with grooves 5 (FIG. 7), for each individual material strip 2, so that these strips lie all in the same plane during the winding or coiling operation. The depth of the grooves 5 is equal to or smaller than the thickness of the material strips 2. In cases where, as in FIGS. 5, 6 or 7, the material strips 2 are arranged on the carrier sheet 1 at a distance from each other, the spiral springs 2 can, after heat treatment, be separated from the coiled carrier sheet 1 in that the later is cut through, e.g. by sawing, between adjacent spiral springs 2 and the spiral springs are then laterally drawn or pushed off the cut-away piece of the coiled sheet 2, if necessary after a slight radial extension of the latter.

In the mode of execution as shown in FIG. 8, the material strips are arranged obliquely to the winding or coiling axis so that conical spiral or coil springs are obtained. Also in this case, the material strips 2 may, as described above, be arranged at a distance from each other, if desired, by intercalating intermediate strips securing the desired distance. Also in the case of manufacturing such conical spiral springs, grooves may be provided in the carrier sheet 1 for guaranteeing the desired distance between adjacent strips 2.

In a further mode of execution of the method according to the invention, a carrier sheet of variable thickness may be used in order to obtain spiral springs with variable distance of adjacent turns from each other, i.e., with variable radial pitch.

The carrier sheet 1 together with the material strips 2 arranged thereon may also be wound or coiled around a shaft 6 of suitable shape, such as, for instance, a shaft, the circumference of the cross section of which forms at the beginning an Archimedes' spiral (FIG. 9) so that a geometrically correct shape of the spiral springs is obtained.

In the mode of execution of FIG. 10 of the method according to the invention for manufacturing hairsprings for balances of watches, the material strips 2 are previously fixed by means of pins 8 to collets 7 usual for watch balances. Thereafter, the collets 7 are slipped onto a shaft and one or more carrier sheets are brought between the strips whereupon the strips 2 together with the sheet or sheets are wound or coiled to spirals by driving the collets 7 for instance by means of the shaft with which they may be coupled in circumferential direction by means of keys or wedges. Instead of fixing the material strips 2 to the collets 7 by means of pins, they may be electrically welded to the collets 7.

It is not necessary that the beginning of the carrier sheet 1 coincides with the beginning of the material strips 2. In certain cases, it may even be preferred to wind or coil the carrier sheet 1 alone by two or three turns and to clamp afterwards the fore ends of the material strips 2 between the cylinder formed by the already wound portion and the unwound portion of the carrier sheet 1 (FIG. 11).

The material for the carrier sheet 1 must, of course, be chosen so that it can resist the temperature of the heat treatment necessary for permanently fixing the shape of the spiral springs.

The method according to the invention allows of a quick series production of spiral springs. Furthermore, it renders possible the manufacture of spiral springs whose wire has any cross-section desired and not only spiral springs with flat, i.e., rectangular cross section.

We claim:

1. A method for manufacturing spiral hairsprings or mainsprings for watches comprising the steps of placing a plurality of metal strips of spring material parallel to each other on the flat face of a common metallic rigid and bendable carrier sheet with the carrier sheet being of a greater thickness than the thickness of the strips and being of a width at least equal to the sum total of the widths of said strips and of a length substantially equal to the lengths of the strips; securing said strips in parallel relation on the face of the carrier sheet; winding the carrier sheet with the adherent strips about an axis of revolution to form said strips and carrier sheet into spiral form; applying a heat treatment to the wound assembly of strips and carrier sheet to give the strips a permanently fixed shape and removing the wound carrier sheet from the wound strips to provide finished individual spiral springs having spaced convolutions with the springs having the same radial pitch.

2. A method for manufacturing hairsprings assemblies for balances of watches comprising the steps of removably mounting a plurality of collets in spaced relation on a rotatable shaft in fixed relation to the shaft; permanently fixing an end of a metal strip of spring material to each collet with the strips being similarly dimensioned and extending in straight flat condition radially outwardly from the collets; securing a common carrier sheet of greater thickness than the thickness of the strips flat on the strips in superimposed relation therewith, with the width of the carrier sheet being at least equal to the sum total of the width of the strips and the length of the carrier sheet being substantially equal to the length of the strips; rotating said collets and the strips and carrier sheet to wind the strips and carrier sheet about the peripheries of the collets to form the strips and the carrier sheet into a spiral shape; heat treating the wound assembly of the carrier sheet and the strips to give the strips a permanently fixed shape and removing the wound carrier sheet from the wound strips to provide a plurality of similarly assembled collets and spring assemblies with the springs having spaced convolutions lying about the collets and with the springs having the same radial pitch.

3. A method as claimed in claim 1, where the strips are placed on the carrier sheet in side by side contact.

4. A method as claimed in claim 1, wherein the strips are placed on the carrier sheet in a laterally spaced arrangement and are held against movement laterally of the carrier sheet.

5. A method as claimed in claim 1, wherein the longitudinal edges of the strips when placed on the carrier sheet are arranged vertically to said axis of revolution.

6. A method as claimed in claim 1, wherein the longitudinal edges of the strips when placed on the carrier sheet are arranged obliquely to said axis of revolution.

7. A method as claimed in claim 1, wherein the thickness of the carrier sheet is variable along at least part of the length thereof with the entire carrier sheet still being of a greater thickness than the thickness of the strips.

References Cited by the Examiner

UNITED STATES PATENTS

| | | | |
|---|---|---|---|
| 477,065 | 6/92 | Richard et al. | 153—64 X |
| 1,780,732 | 11/30 | Young | 29—423 |
| 1,844,108 | 2/32 | Smythe | 29—423 X |
| 2,075,815 | 4/37 | Knox | 29—173 |
| 2,166,852 | 7/39 | Weiss. | |
| 2,329,548 | 9/43 | Lynch et al. | 148—11.5 |
| 2,516,930 | 8/50 | Varian | 29—423 X |
| 2,628,996 | 2/53 | Mayo | 29—155.57 X |
| 2,986,810 | 6/61 | Brick | 29—423 |
| 3,049,790 | 8/62 | Camras | 29—155.57 X |

WHITMORE A. WILTZ, *Primary Examiner.*

CHARLES W. LANHAM, JOHN F. CAMPBELL,
*Examiners.*